(12) United States Patent
Chrabascz et al.

(10) Patent No.: US 9,228,593 B2
(45) Date of Patent: Jan. 5, 2016

(54) RAM AIR FAN OUTER HOUSING

(75) Inventors: Eric Chrabascz, Longmeadow, MA (US); Craig M. Beers, Wethersfield, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 741 days.

(21) Appl. No.: 13/585,903

(22) Filed: Aug. 15, 2012

(65) Prior Publication Data
US 2014/0050574 A1 Feb. 20, 2014

(51) Int. Cl.
| | |
|---|---|
| *F04D 29/52* | (2006.01) |
| *B64D 13/02* | (2006.01) |
| *F04D 29/64* | (2006.01) |
| *B64D 13/00* | (2006.01) |
| *F04D 29/02* | (2006.01) |
| *B64D 13/06* | (2006.01) |

(52) U.S. Cl.
CPC .............. *F04D 29/522* (2013.01); *B64D 13/00* (2013.01); *B64D 13/02* (2013.01); *F04D 29/023* (2013.01); *F04D 29/644* (2013.01); *B64D 2013/0618* (2013.01); *Y02T 50/44* (2013.01); *Y02T 50/56* (2013.01)

(58) Field of Classification Search
CPC ... F04D 29/522; F04D 29/403; F04D 29/644; B64D 13/02; B64D 2013/0618; Y02T 50/433; Y02T 50/44; F01D 25/24
See application file for complete search history.

(56) References Cited

U.S. PATENT DOCUMENTS

| | | |
|---|---|---|
| 1,940,466 A | 12/1933 | Sneed |
| 2,527,229 A | 10/1950 | Roubal |
| 2,752,515 A | 6/1956 | Baudry et al. |
| 3,410,029 A | 11/1968 | Savage |
| 3,433,020 A | 3/1969 | Earle, Jr. et al. |
| 3,588,044 A | 6/1971 | Reichrath et al. |
| 3,763,835 A | 10/1973 | Miller et al. |
| 3,915,024 A | 10/1975 | Mort |
| 3,949,550 A | 4/1976 | Albrecht et al. |
| 3,999,872 A | 12/1976 | Allison |
| 4,012,154 A | 3/1977 | Durwin et al. |
| 4,439,106 A | 3/1984 | Ferris et al. |
| 4,511,193 A | 4/1985 | Geczy |
| 4,543,785 A | 10/1985 | Patrick |
| 4,979,872 A | 12/1990 | Myers et al. |
| 5,239,815 A | 8/1993 | Barcza |
| 5,505,587 A | 4/1996 | Ghetzler |
| 5,529,316 A | 6/1996 | Mattila |

(Continued)

OTHER PUBLICATIONS

Binek et al., U.S. Appl. No. 13/279,508, filed Oct. 24, 2011.

*Primary Examiner* — Richard Edgar
*Assistant Examiner* — Juan G Flores
(74) *Attorney, Agent, or Firm* — Kinney & Lange, P.A.

(57) ABSTRACT

A ram air fan outer housing for directing air from a ram air fan rotor and air from a ram air bypass into a ram air fan outlet. The outer housing includes an outer cylinder and a plenum connected at a joint region. The outer cylinder is made of a laminate stacking sequence of at least four adjacent layers of plain-weave carbon-fiber fabric in an A-B-B-A sequence. The plenum is made of a laminate stacking sequence of at least eight adjacent plenum layers of plain-weave carbon-fiber fabric in an A-B-B-A-A-B-B-A sequence. The plenum is joined to the outer cylinder at a joint region, the joint region includes a transition section transitioning the laminate stacking sequence from the eight adjacent layers of the plenum walls to the four adjacent layers of the outer cylinder walls.

18 Claims, 11 Drawing Sheets

(56) References Cited

U.S. PATENT DOCUMENTS

| | | |
|---|---|---|
| 5,683,184 A | 11/1997 | Striedacher et al. |
| 6,299,077 B1 | 10/2001 | Harmon et al. |
| 6,380,647 B2 | 4/2002 | Hayashi et al. |
| 6,698,933 B2 | 3/2004 | Lau |
| 6,926,490 B2 | 8/2005 | McAuliffe et al. |
| 6,928,963 B2 | 8/2005 | Karanik |
| 6,966,174 B2 | 11/2005 | Paul |
| 7,165,939 B2 | 1/2007 | Chen et al. |
| 7,342,332 B2 | 3/2008 | McAuliffe et al. |
| 7,394,175 B2 | 7/2008 | McAuliffe et al. |
| 7,397,145 B2 | 7/2008 | Struve et al. |
| 7,757,502 B2 * | 7/2010 | Merritt et al. ............ 62/172 |
| 7,952,241 B2 | 5/2011 | Kato et al. |
| 2002/0171218 A1 | 11/2002 | Bell |
| 2006/0061221 A1 | 3/2006 | McAuliffe et al. |
| 2010/0055383 A1 | 3/2010 | Schalla et al. |
| 2010/0084090 A1 * | 4/2010 | Shinoda et al. ............ 156/309.9 |
| 2010/0148396 A1 * | 6/2010 | Xie et al. ............ 264/259 |
| 2010/0310392 A1 * | 12/2010 | Lippold et al. ............ 417/405 |
| 2013/0098045 A1 * | 4/2013 | Binek et al. ............ 60/767 |

* cited by examiner

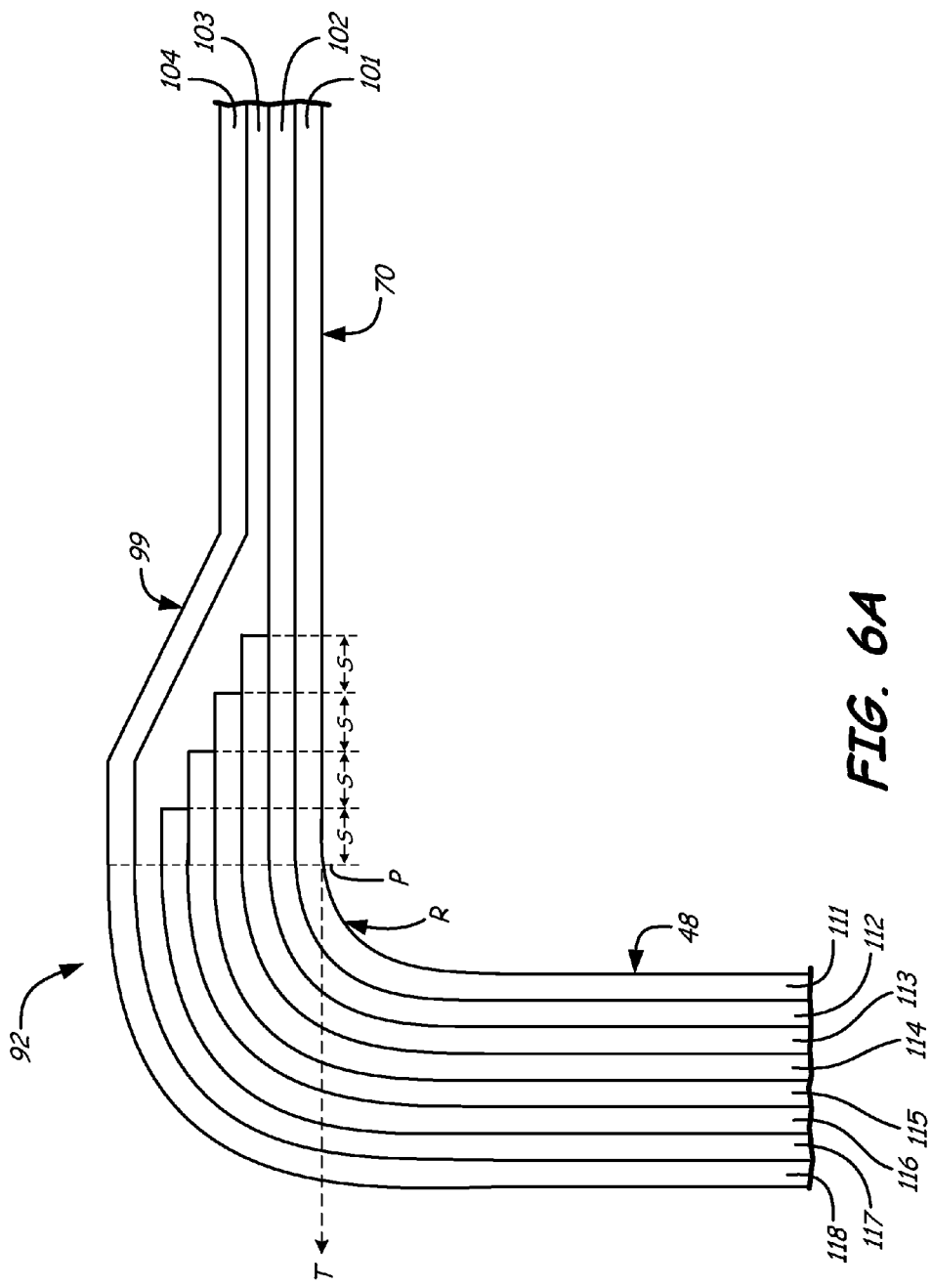

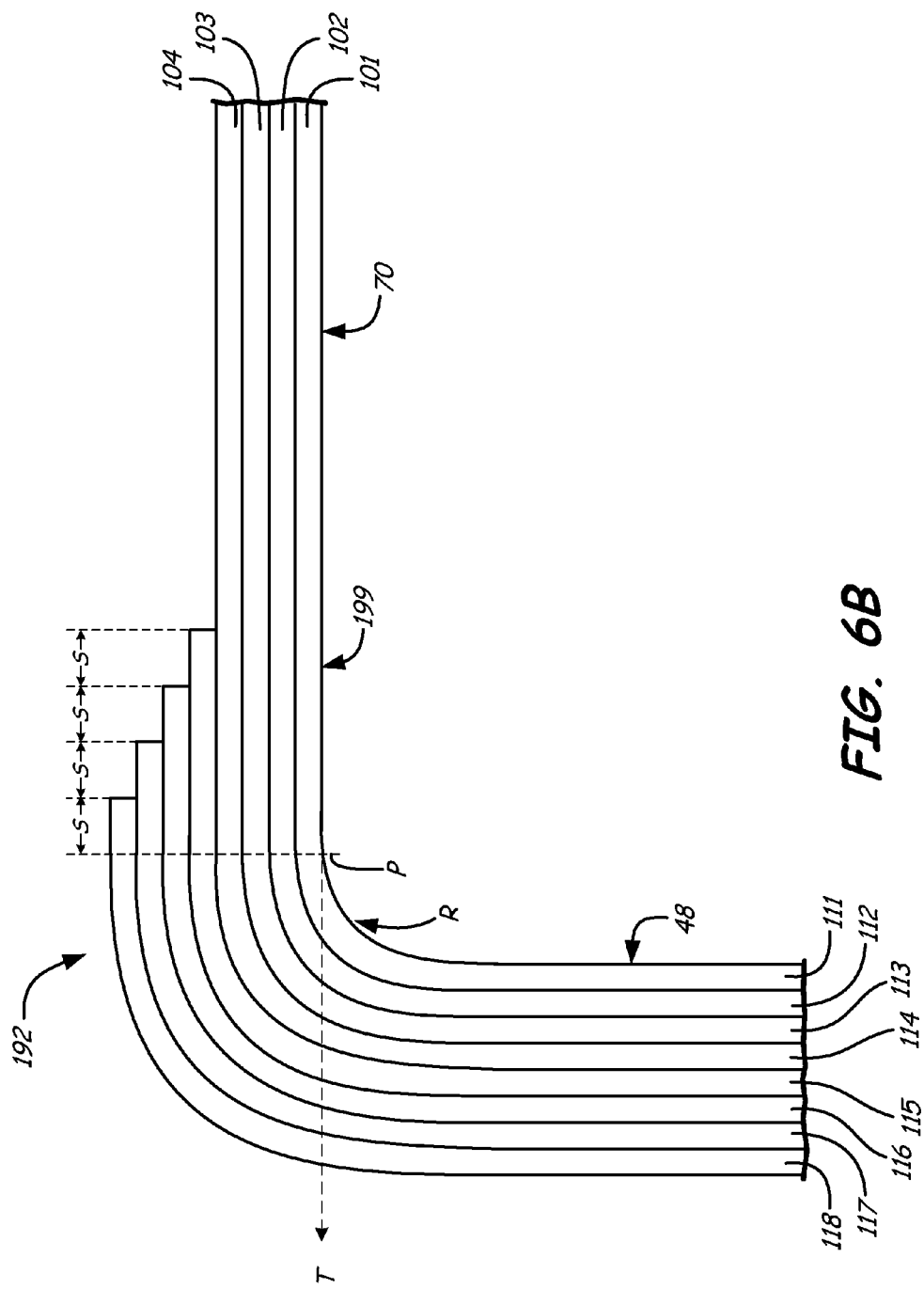

RAM AIR FAN OUTER HOUSING

BACKGROUND

The present invention relates to an environmental control system. In particular, the invention relates to an outer housing of a ram air fan assembly for an environmental control system for an aircraft.

An environmental control system (ECS) aboard an aircraft provides conditioned air to an aircraft cabin. Conditioned air is air at a temperature, pressure, and humidity desirable for aircraft passenger comfort and safety. At or near ground level, the ambient air temperature and/or humidity is often sufficiently high that the air must be cooled as part of the conditioning process before being delivered to the aircraft cabin. At flight altitude, ambient air is often far cooler than desired, but at such a low pressure that it must be compressed to an acceptable pressure as part of the conditioning process. Compressing ambient air at flight altitude heats the resulting pressurized air sufficiently that it must be cooled, even if the ambient air temperature is very low. Thus, under most conditions, heat must be removed from air by the ECS before the air is delivered to the aircraft cabin. As heat is removed from the air, it is dissipated by the ECS into a separate stream of air that flows into the ECS, across heat exchangers in the ECS, and out of the aircraft, carrying the excess heat with it. Under conditions where the aircraft is moving fast enough, the pressure of air ramming into the aircraft is sufficient to move enough air through the ECS and over the heat exchangers to remove the excess heat.

While ram air works well under normal flight conditions, at lower flight speeds, or when the aircraft is on the ground, ram air pressure is too low to provide enough air flow across the heat exchangers for sufficient heat removal from the ECS. Under these conditions, a fan within the ECS is employed to provide the necessary airflow across the ECS heat exchangers. This fan is called a ram air fan.

As with any system aboard an aircraft, there is great value in an improved ram air fan that includes innovative components, such as an outer housing designed to improve the operational efficiency of the ram air fan or to reduce its weight.

SUMMARY

The present invention is a ram air fan outer housing for directing air from a ram air fan rotor and air from a ram air bypass into a ram air fan outlet. The outer housing includes an outer cylinder and a plenum connected at a joint region. The outer cylinder is made of a laminate stacking sequence of at least four adjacent layers of plain-weave carbon-fiber fabric. Each layer of the stacking sequence has a weave orientation such that a first layer and a fourth layer are oriented forty-five degrees from each of a second layer and a third layer. The second layer and the third layer are sandwiched between the first layer and the fourth layer. The plenum is made of a laminate stacking sequence of at least eight adjacent plenum layers of plain-weave carbon-fiber fabric. Each layer of the eight adjacent layers has a weave orientation such that a first layer, a fourth layer, a fifth layer, and an eighth layer are oriented forty-five degrees from each of a second layer, a third layer, a sixth layer, and a seventh layer. The second layer and the third layer are sandwiched between the first layer and the fourth layer; the sixth layer and the seventh layer are sandwiched between the fifth layer and the eighth layer; and the fourth layer and the fifth layer are sandwiched between the third layer and the sixth layer. The plenum is joined to the outer cylinder at a joint region, the joint region includes a transition section transitioning the laminate stacking sequence from the eight adjacent layers of the plenum walls to the four adjacent layers of the outer cylinder walls.

BRIEF DESCRIPTION OF THE DRAWINGS

FIGS. 6A-6D are cross-sectional views of another portion of the outer housing of FIG. 4.

DETAILED DESCRIPTION

A ram air fan assembly in an environmental control system (ECS) employs an outer housing to channel air from a ram air fan rotor and air from a ram air bypass into a ram air fan outlet. The outer housing is the single largest component of the ram air fan assembly. The present invention is a ram air fan outer housing that is durable, while also being lightweight. An outer housing embodying the present invention incorporates innovative features that increase durability and ensure a lightweight housing. The outer housing is made of fiber-reinforced polymer composite plies, such as carbon-fiber plies, oriented in a specific sequence of layers, with the number of layers and the overlap of adjacent layers varying as a function of the need for strength. The use of a reinforcing fiber, such as carbon-fiber, in this manner provides a very strong and lightweight structure. The outer housing includes an outer cylinder and a plenum attached to the outer cylinder. The outer housing is designed with an exceptionally small ratio of a length of the outer cylinder to a diameter of the outer cylinder at a ram air fan outlet. A relatively large outer cylinder diameter at the ram air fan outlet enables efficient fan flow. Keeping the length of the outer cylinder relatively short reduces stresses on the outer housing, particularly at joints between the cylindrical section and the plenum. By reducing stresses, less material is required to reinforce these joints, contributing to a relatively lightweight outer housing.

Figure 1:
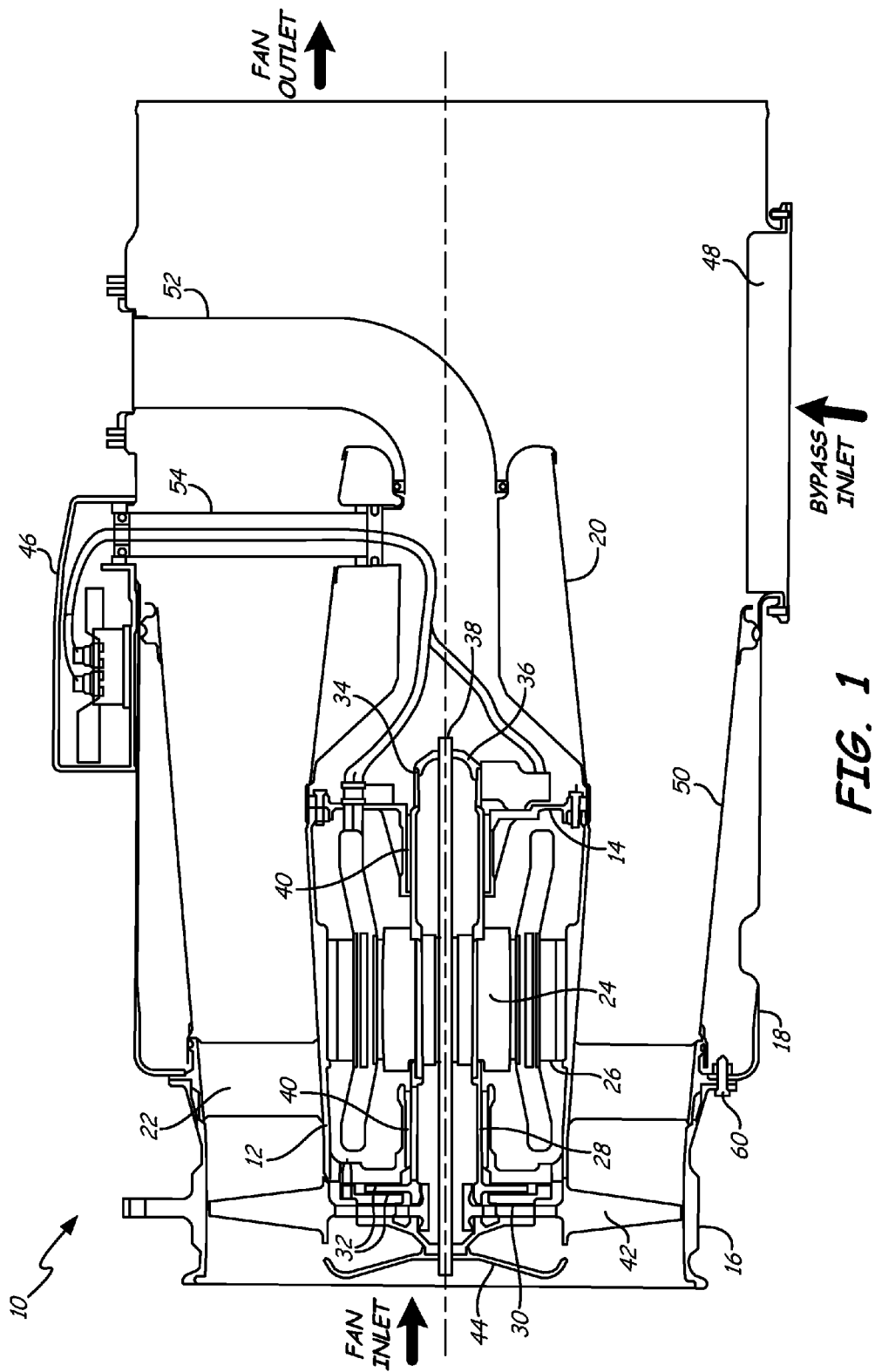
FIG. 1 is a side view of a ram air fan assembly.

FIG. 1 illustrates a ram air fan air assembly. FIG. 1 shows ram air fan assembly 10 including fan housing 12, bearing housing 14, inlet housing 16, outer housing 18, inner housing 20, and a plurality of bolts 60. Fan housing 12 includes fan struts 22, motor rotor 24, motor stator 26, thrust shaft 28, thrust plate 30, and thrust bearings 32. Bearing housing 14 includes journal bearing shaft 34 and shaft cap 36. Fan housing 12 and bearing housing 14 together include tie rod 38 and journal bearings 40. Inlet housing 16 contains fan rotor 42 and inlet shroud 44, in addition to a portion of tie rod 38. Outer housing 18 includes terminal box 46 and plenum 48. Within outer housing 18 are diffuser 50, motor bearing cooling tube 52, and wire transfer tube 54. A fan inlet is a source of air to be moved by ram air fan assembly 10 in the absence of sufficient ram air pressure. A bypass inlet is a source of air to that moves through ram air fan assembly 10 when sufficient ram air pressure is available.

As illustrated in FIG. 1, inlet housing 16 and outer housing 18 are attached to fan housing 12 at fan struts 22 by a plurality of bolts 60. Bearing housing 14 is attached to fan housing 12 and inner housing 20 connects motor bearing cooling tube 52 and wire transfer tube 54 to bearing housing 14. Motor bearing cooling tube 52 connects inner housing 20 to a source of cooling air at outer housing 18. Wire transfer tube 54 connects inner housing 20 to outer housing 18 at terminal box 46. Motor stator 26 and thrust plate 30 attach to fan housing 12. Motor rotor 24 is contained within motor stator 26 and connects journal bearing shaft 34 to thrust shaft 28. Journal bearing shaft 34, motor rotor 24, and thrust shaft 28 define an axis of rotation for ram air fan assembly 10. Fan rotor 42 is attached to thrust shaft 28 with tie rod 38 extending along the axis of rotation from shaft cap 36 at the end of journal bearing shaft 34 through motor rotor 24, thrust shaft 28, and fan rotor 42 to inlet shroud 44. Nuts (not shown) secure shaft cap 36 to journal bearing shaft 34 on one end of tie rod 38 and inlet shroud 44 to fan rotor 42 at opposite end of tie rod 38. Thrust plate 30 and fan housing 12 contain a flange-like portion of thrust shaft 28, with thrust bearings 32 positioned between the flange-like portion of thrust shaft 28 and thrust plate 30; and between the flange-like portion of thrust shaft 28 and fan housing 12. Journal bearings 40 are positioned between journal bearing shaft 24 and bearing housing 14; and between thrust shaft 28 and fan housing 12. Inlet shroud 44, fan rotor 42, and a portion of fan housing 12 are contained within inlet housing 16. Diffuser 50 is attached to an inner surface of outer housing 18. Plenum 48 is a portion of outer housing 18 that connects ram air fan assembly 10 to the bypass inlet. Inlet housing 16 is connected to the fan inlet and outer housing 18 is connected to a fan outlet.

In operation, ram air fan assembly 10 is installed into an environmental control system aboard an aircraft and connected to the fan inlet, the bypass inlet, and the fan outlet. When the aircraft does not move fast enough to generate sufficient ram air pressure to meet the cooling needs of the ECS, a ram air fan motor controller (not shown) supplies power to motor stator 26 by wires running from terminal box 46, through wire transfer tube 54, inner housing 20, and bearing housing 14. Energizing motor stator 26 causes rotor 24 to rotate about the axis of rotation for ram air fan assembly 10, rotating connected journal bearing shaft 34 and thrust shaft 28. Fan rotor 42 and inlet shroud 44 also rotate by way of their connection to thrust shaft 28. Journal bearings 40 and thrust bearings 32 provide low friction support for the rotating components. As fan rotor 42 rotates, it moves air from the fan inlet, through inlet housing 20, past fan struts 22 and into the space between fan housing 12 and outer housing 18, increasing the air pressure in outer housing 18. As the air moves through outer housing 18, the air flows past diffuser 50 and inner housing 20, where the air pressure is reduced due to the shape of diffuser 50 and the shape of inner housing 20. Once past inner housing 20, the air moves out of outer housing 18 at the fan outlet. Components within bearing housing 14 and fan housing 12, especially thrust bearings 32, journal bearings 40, motor stator 26, and motor rotor 24; generate significant heat and must be cooled. Cooling air is provided by motor bearing cooling tube 52 which directs a flow of cooling air to inner housing 20. Inner housing 20 directs flow of cooling air to bearing housing 14, where it flows past components in bearing housing 14 and fan housing 12, cooling the components. Once the aircraft moves fast enough to generate sufficient ram air pressure to meet the cooling needs of the ECS, ram air is directed into plenum 48 from the bypass inlet. The ram air passes into outer housing 18 at plenum 48 and moves out of outer housing 18 at the fan outlet.

Figure 2:
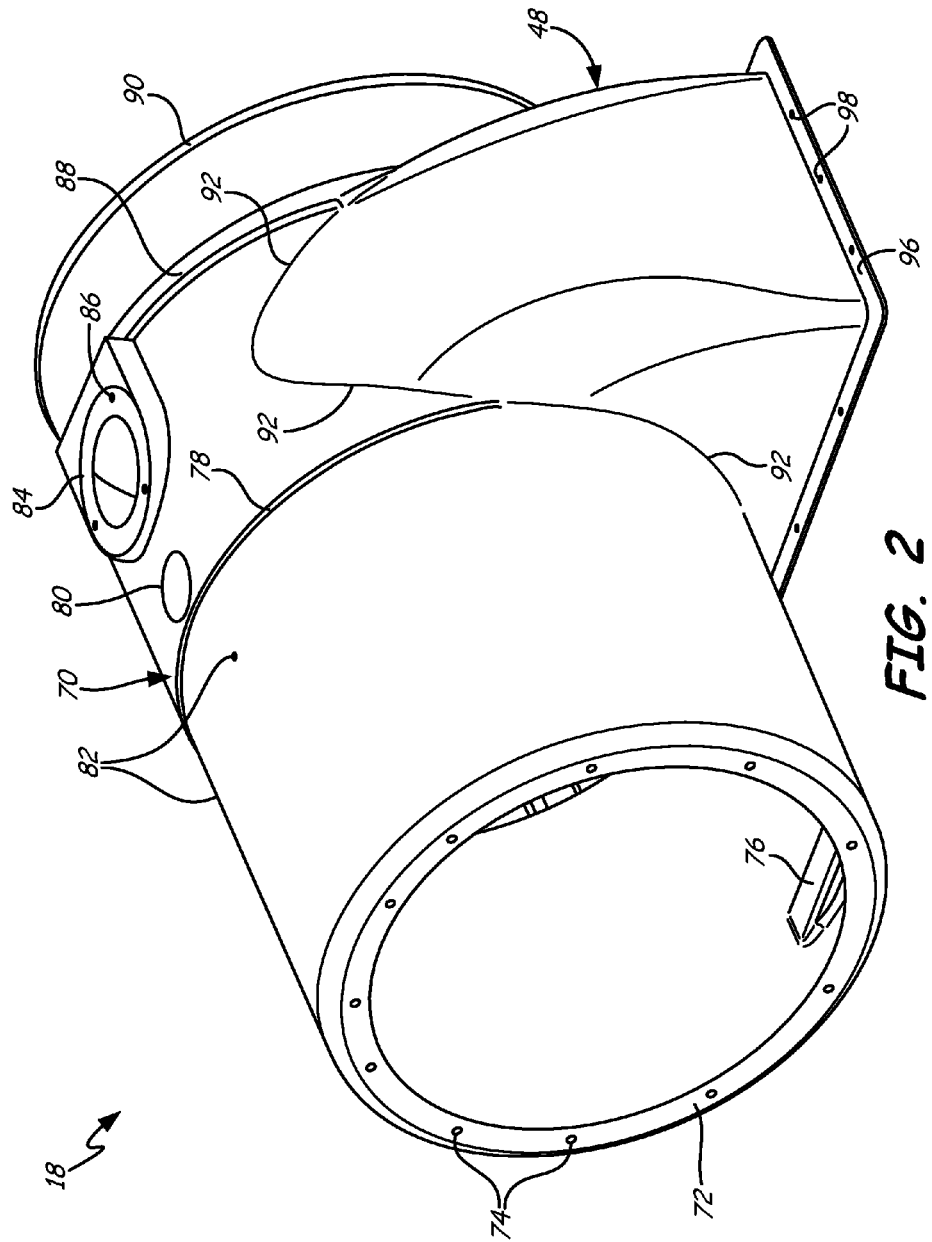
FIG. 2 is a perspective view of an outer housing embodying the present invention.

As shown in FIG. 1, outer housing 18 includes terminal box 46 and plenum 48. FIG. 1 also shows that outer housing 18 has a ram air fan outlet end and a ram air fan inlet end opposite the ram air fan outlet end. FIG. 2 is a perspective view of outer housing 18, with terminal box 46 omitted for clarity. FIG. 2 shows that outer housing 18 further includes outer cylinder 70. Outer cylinder 70 includes inlet flange 72, inlet flange bolt holes 74, component channel 76, diameter transition 78, terminal box opening 80, terminal box bolt holes 82, cooling air flange 84, cooling air flange bolt holes 86, outer cylinder support ridge 88, and outlet bead 90. Plenum 48 includes plenum flange 96, and plenum flange bolt holes 98. Outer cylinder 70 includes the ram air fan outlet end and the ram air fan inlet end of outer housing 18. Outer cylinder 70 has two external diameters, a first external diameter at the ram air fan outlet end and a second external diameter at the ram air fan inlet end. Outer cylinder 70 transitions from the first external diameter to the second external diameter at diameter transition 78. Thus, the first external diameter extends from the ram air fan outlet end to diameter transition 78 and the second external diameter extends from diameter transition 78 to the ram air fan rotor end at inlet flange 72. Outlet cylinder 70 has a single axis running the length of outer cylinder 70 at the midpoint of both the first external diameter and the second external diameter. Once attached to fan housing 12, the axis of outer cylinder 70 is, ideally, aligned with the axis of rotation for ram air fan assembly 10 described above in reference to FIG. 1.

As shown in FIG. 2, plenum 48 attaches to outer cylinder 70 at cylinder-to-plenum joint 92. Inlet flange 72 is the end of outer cylinder 70 corresponding to the ram air fan rotor end of outer housing 18. Inlet flange 72 connects outer housing 18 to fan housing 12 at an outer surface of inlet flange 72 with bolts 60, as shown in FIG. 1, through inlet flange bolt holes 74, as shown in FIG. 2. Component channel 76 is an indented portion of outer cylinder 70 to allow outer housing 18 to fit around a component external to outer housing 18 when ram air fan assembly 10 is installed in an ECS. Diameter transition 78 is a section of outer cylinder 70 where outer cylinder 70 transitions between two external diameters. Terminal box opening 80 is a hole in outer cylinder 70 through which electrical wires from within outer housing 18 connect to terminal box 46. Terminal box bolt holes 82 provide attachment points for terminal box 46 as described below in reference to FIG. 4. Cooling air flange 84 is a flanged connection for a cooling air duct (not shown) to provide cooling air to motor bearing cooling tube 52, shown in FIG. 1. The cooling air duct is secured through cooling air flange bolt holes 86. Outer cylinder support ridge 88 is a portion of outer cylinder 70 shaped for mechanical support of outer cylinder 70 and extending along at least a portion of outer cylinder 70 in a plane perpendicular to the axis of outer cylinder 70. Outlet bead 90 is a portion of outer cylinder 70 shaped to retain a "hose clamp" type connection to a duct (not shown) for exhausting ram air from ram air fan assembly 10. Outlet bead 90 is near the end of outer cylinder 70 corresponding to the ram air fan outlet end of outer housing 18. Outlet bead 90 extends along outer cylinder 70 in a plane perpendicular to the axis of outer cylinder 70. Plenum flange 96 is a connection flange for attaching plenum 48 to the bypass inlet. The connection is secured by bolts through plenum flange bolt holes 98.

Figure 3:
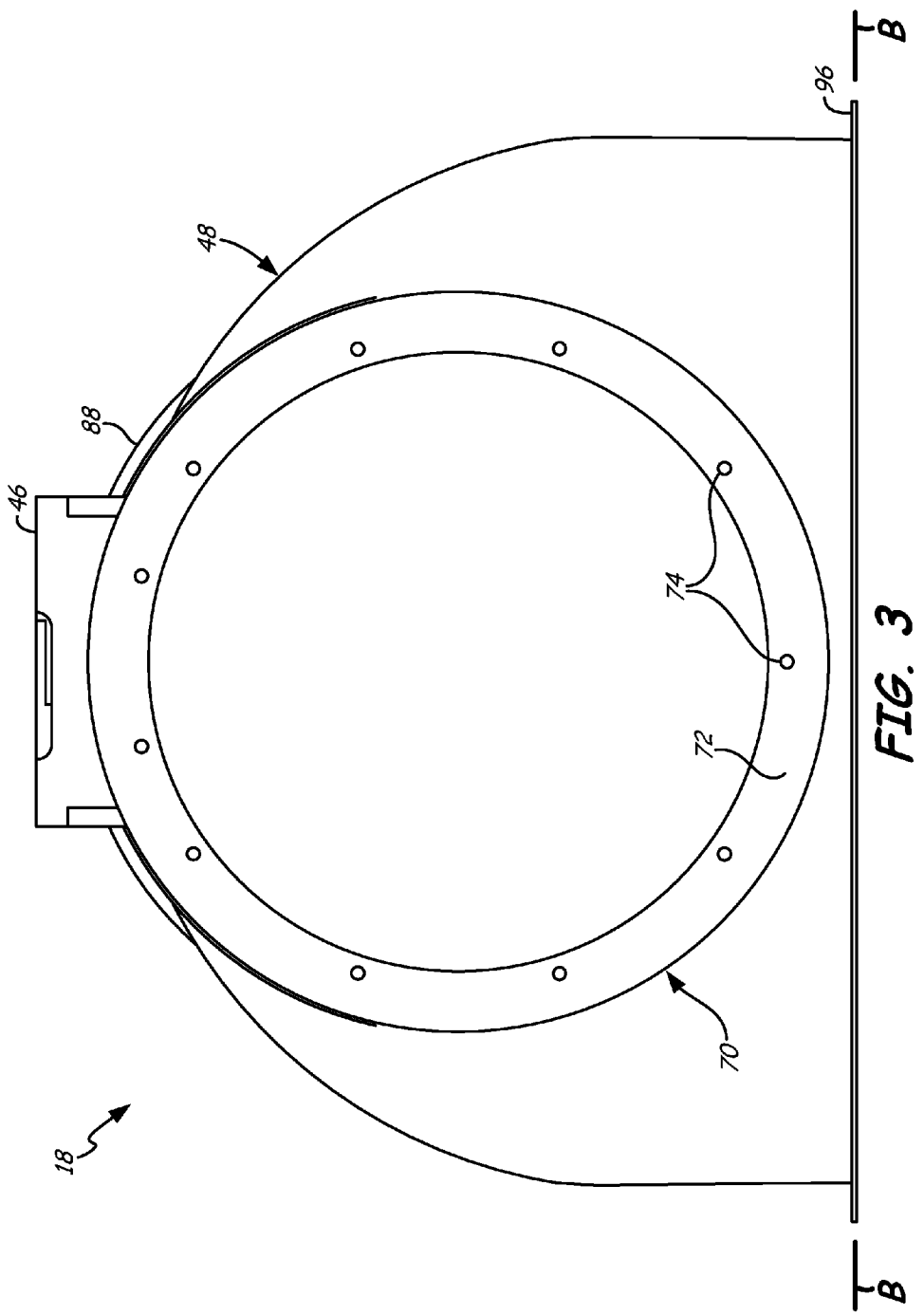
FIG. 3 is an end view of the outer housing of FIG. 2.

FIG. 3 is an end view of the outer housing of FIG. 2, looking at the ram air fan rotor end of outer housing 18. FIG. 3 shows the circular profile of outer cylinder 70. The axis of outer cylinder 70 is at the center of the circular profile of outer cylinder 70. Plenum 48 curves into outer cylinder 70 near a side of outer cylinder 70 opposite plenum flange 96. The surface of plenum flange 96 facing away from outer cylinder 70 defines reference flange plane B. Plenum 48 also curves into flat walls tangent to the radius of curvature of plenum 48 with the flat walls meeting plenum flange 96 at a right angle. The center of the radius of curvature for the curved portion of plenum 48 does not coincide with the center of the circular profile of outer cylinder 70.

Figure 4:
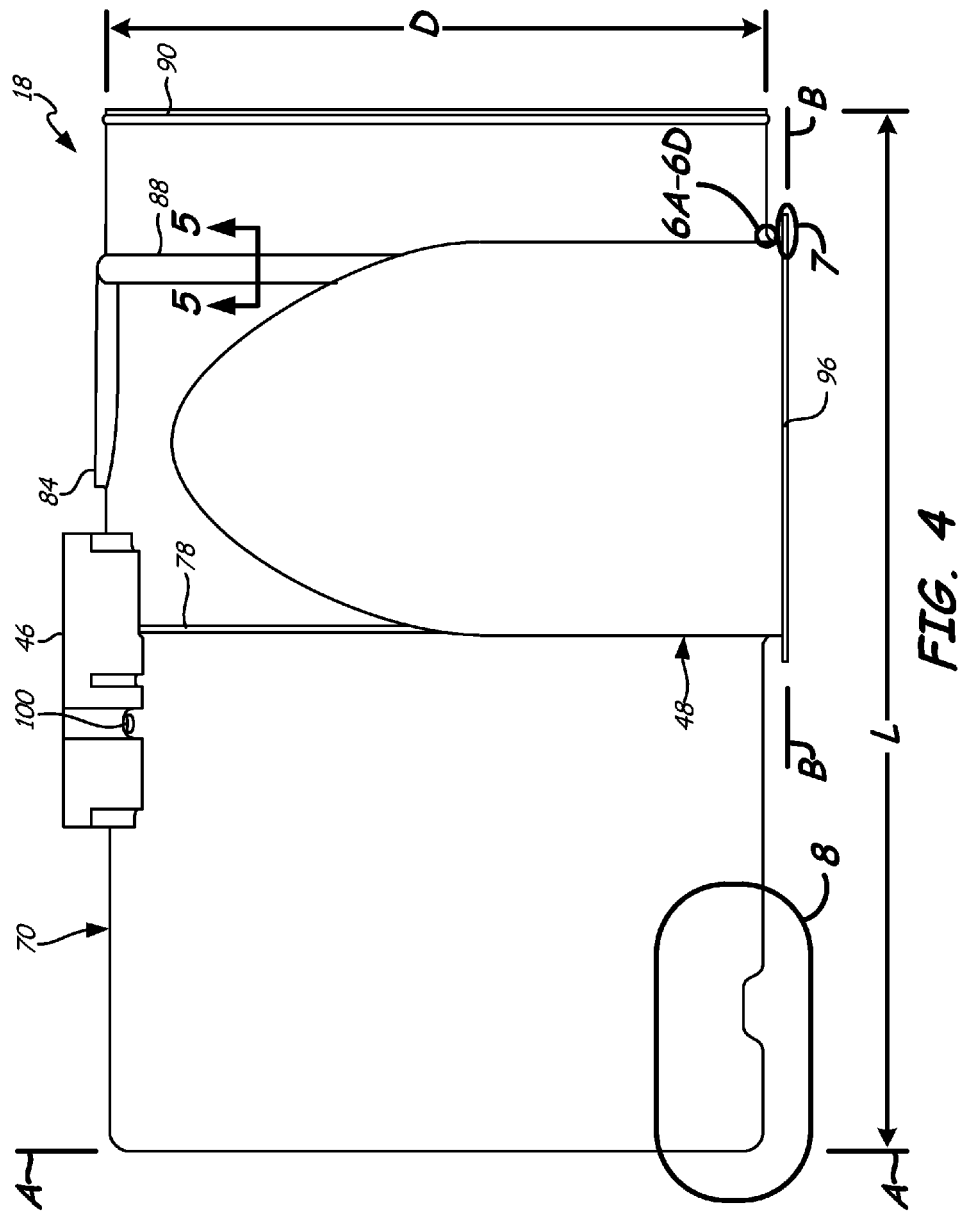
FIG. 4 is a side view of the outer housing of FIG. 2.

FIG. 4 is a side view of the outer housing of FIG. 2. FIG. 4 shows terminal box 46 connected to outer cylinder 70 by terminal box bolt 100 through terminal box bolt holes 82 as shown in FIG. 2. Terminal box 46 is also secured to outer cylinder 70 by a permanent adhesive. As noted in reference to FIG. 2, outer cylinder 70 has a ram air fan rotor end (at inlet flange 72) and a ram air fan outlet end (near outlet bead 90) at opposite ends of an axis of outer cylinder 70. The outer surface of inlet flange 72 defines reference flange plane A, which is perpendicular to the axis of outer cylinder 70. As also noted above, outer cylinder 70 has two external diameters, the first external diameter extending from the ram air fan outlet end to diameter transition 78 and the second external diameter extending from diameter transition 78 to the ram air fan rotor end at reference flange plane A. The second external diameter is determined by the size of the components contained within, such as fan housing 12, bearing housing 14, inner housing 20 and diffuser 50, and the volume of ram air from the fan inlet to be moved by fan rotor 42. In embodiments of the present invention, the first external diameter is greater than the second external diameter to provide efficient flow of ram air from both the fan inlet and the bypass inlet to the fan outlet. However, because the greater external diameter of the first external diameter also increases mechanical stresses on outer housing 18, the external length of outer cylinder 70, and thus the external length of outlet housing 18, is reduced relative to the first external diameter to reduce mechanical stresses on outlet housing 18. Thus, embodiments of the present invention have a ratio of external length (L) to external diameter (D) that is relatively small, the external diameter being the first external diameter of outer cylinder 70 and the external length measured from the ram air fan rotor end to the ram air fan outlet end of outer housing 18 in a direction parallel to the axis of outer cylinder 70, as shown in FIG. 4. In one embodiment, the ratio of external length to external diameter is no greater than 1.5827. In another embodiment, the ratio of external length to external diameter is no greater than 1.5827 and no less than 1.5720. In yet another embodiment, the external length of outer housing 18 is between 26.755 inches and 26.875 inches (or between 679.58 mm and 682.63 mm) and the external diameter is between 16.980 inches and 17.020 inches (or between 431.29 mm and 432.31 mm).

Figure 5:
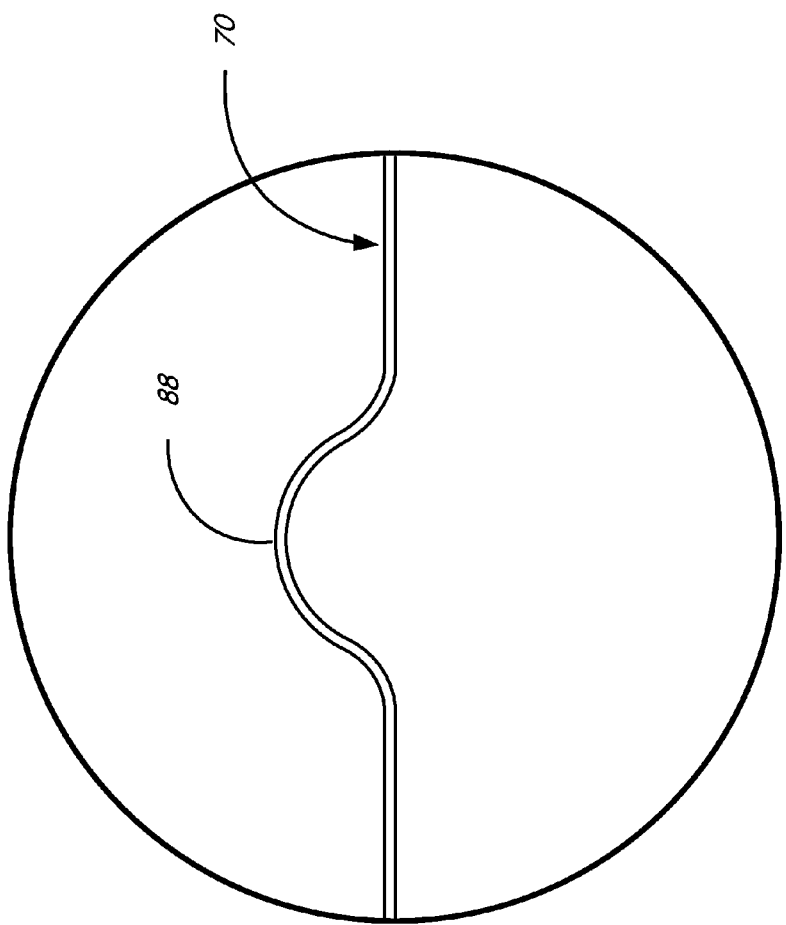
FIG. 5 is a cross-sectional view of a portion of the outer housing of FIG. 4.

FIG. 5 is a cross-sectional view of a portion of the outer housing of FIG. 4. FIG. 5 shows details of outer cylinder support ridge 88. As noted above, outer cylinder support ridge 88 is a portion of outer cylinder 70 shaped for mechanical support of outer cylinder 70. FIG. 5 illustrates that outer cylinder support ridge 88 is formed by roughly semicircular-shaped protrusion of outer cylinder 70. Outer cylinder support ridge 88 protrudes from outer cylinder 70 to provide mechanical support for outer cylinder 70. In one embodiment of the present invention, outer cylinder support ridge 88 protrudes between 0.290 inches and 0.310 inches (or between 7.37 mm and 7.87 mm) radially outward from the external diameter of outer cylinder 70. Alternatives to outer cylinder support ridge 88, such as adding mechanical components or thickening the wall of outer cylinder 70, would add expense and weight. Forming outer cylinder support ridge 88 into outer cylinder 70 provides additional mechanical strength to outer cylinder 70 with little added weight or expense.

Outer cylinder 70 and plenum 48 are made of laminations of plain-weave carbon-fiber sheets. Carbon-fibers are known for tremendous tensile strength for their size and weight. Plain-weave carbon-fiber sheets have bundles of carbon-fiber filaments, know as a strand, woven into a sheet using a plain-weave pattern such that half of the strands are oriented in a first direction, for example, a 0 degree direction, and the other half of the filaments are oriented in a second direction, the second direction at a right angle to the first direction, for example, 90 degrees. This weave orientation provides tensile strength in the 0 degree and 90 degree directions. By laminating several sheets together by employing resins noted for strength at high temperatures, structures with high strength and relatively low weight can be built up.

FIGS. 6A-6D are cross-sectional views of another portion of the outer housing of FIG. 4. FIGS. 6A-6D shows details of alternative embodiments of cylinder-to-plenum joint 92. Cylinder-to-plenum joint 92 is an important joint where significant mechanical stress associated with outer cylinder 70 is transferred to plenum 48. In some embodiments, walls of outer cylinder 70 are comprised of four layers, or plies, of plain-weave carbon-fiber fabric: first cylinder layer 101, second cylinder layer 102, third cylinder layer 103, and fourth cylinder layer 104. The four layers are assembled in a unique laminate stacking sequence to provide excellent tensile strength in more than 0 degree and 90 degree directions. The laminate stacking sequence is such that first cylinder layer 101 and fourth cylinder layer 104 are oriented forty-five degrees from each of second cylinder layer 102 and third cylinder layer 103, in which second cylinder layer 102 and third cylinder layer 103 are sandwiched between first cylinder layer 101 and fourth cylinder layer 104. For example, if first cylinder layer 101 has a weave orientation such that its strands are oriented in 0 degree and 90 degree directions (orientation A), then the next two plies in the laminate stacking sequence (second cylinder layer 102 and third cylinder layer 103) must have weave orientations such that the strands of each ply are oriented in +45 degree and −45 degree directions (orientation B). Fourth cylinder layer 104 in the laminate stacking sequence must have a weave orientation such that its strands are oriented in 0 degree and 90 degree directions (orientation A). This laminate stacking sequence is abbreviated as A-B-B-A, and is employed throughout outer cylinder 70 to create walls with a thickness of, for example, about 0.026 inches (or about 0.66 mm), that are strong, but lightweight.

Plenum 48 is constructed to handle greater stresses than outer cylinder 70. In some embodiments, walls of plenum 48 are comprised of eight layers of plain-weave carbon-fiber fabric: first plenum layer 111, second plenum layer 112, third plenum layer 113, fourth plenum layer 114, fifth plenum layer 115, sixth plenum layer 116, seventh plenum layer 117, and eighth plenum layer 118. The eight layers are assembled in a unique laminate stacking sequence to provide excellent tensile strength in more than 0 degree and 90 degree directions. The laminate stacking sequence is such that first plenum layer 111, fourth plenum layer 114, fifth plenum layer 115, and eighth plenum layer 118 are oriented forty-five degrees from each of second plenum layer 112, third plenum layer 113, sixth plenum layer 116, and seventh plenum layer 117. Second plenum layer 112 and third plenum layer 113 are sandwiched between first plenum layer 111 and fourth plenum layer 114; sixth plenum layer 116 and seventh plenum layer 117 are sandwiched between fifth plenum layer 115 and eighth plenum layer 118; and fourth plenum layer 114 and fifth plenum layer 115 are sandwiched between third plenum layer 113 and sixth plenum layer 116. For example, if first plenum layer 111 has a weave orientation such that its strands are oriented in 0 degree and 90 degree directions (orientation A), then the next two plies in the laminate stacking sequence (second plenum layer 112 and third plenum layer 113) must have weave orientations such that the strands of each ply are oriented in +45 degree and −45 degree directions (orientation B). Fourth plenum layer 114 and fifth plenum layer 115 in the laminate stacking sequence must have a weave orientation such that their strands are oriented in 0 degree and 90 degree directions (orientation A). Sixth plenum layer 116 and seventh plenum layer 117 have a weave orientation such that strands of each ply are oriented in +45 degree and −45 degree directions (orientation B). Finally, eighth plenum layer 118 has a weave orientation such that its strands are oriented in 0 degree and 90 degree directions. This laminate stacking sequence is abbreviated as A-B-B-A-A-B-B-A, and is employed throughout plenum 48 to create walls with a thickness of, for example, about 0.052 inches (or about 1.32 mm), that are strong, but lightweight.

Figure 6C:
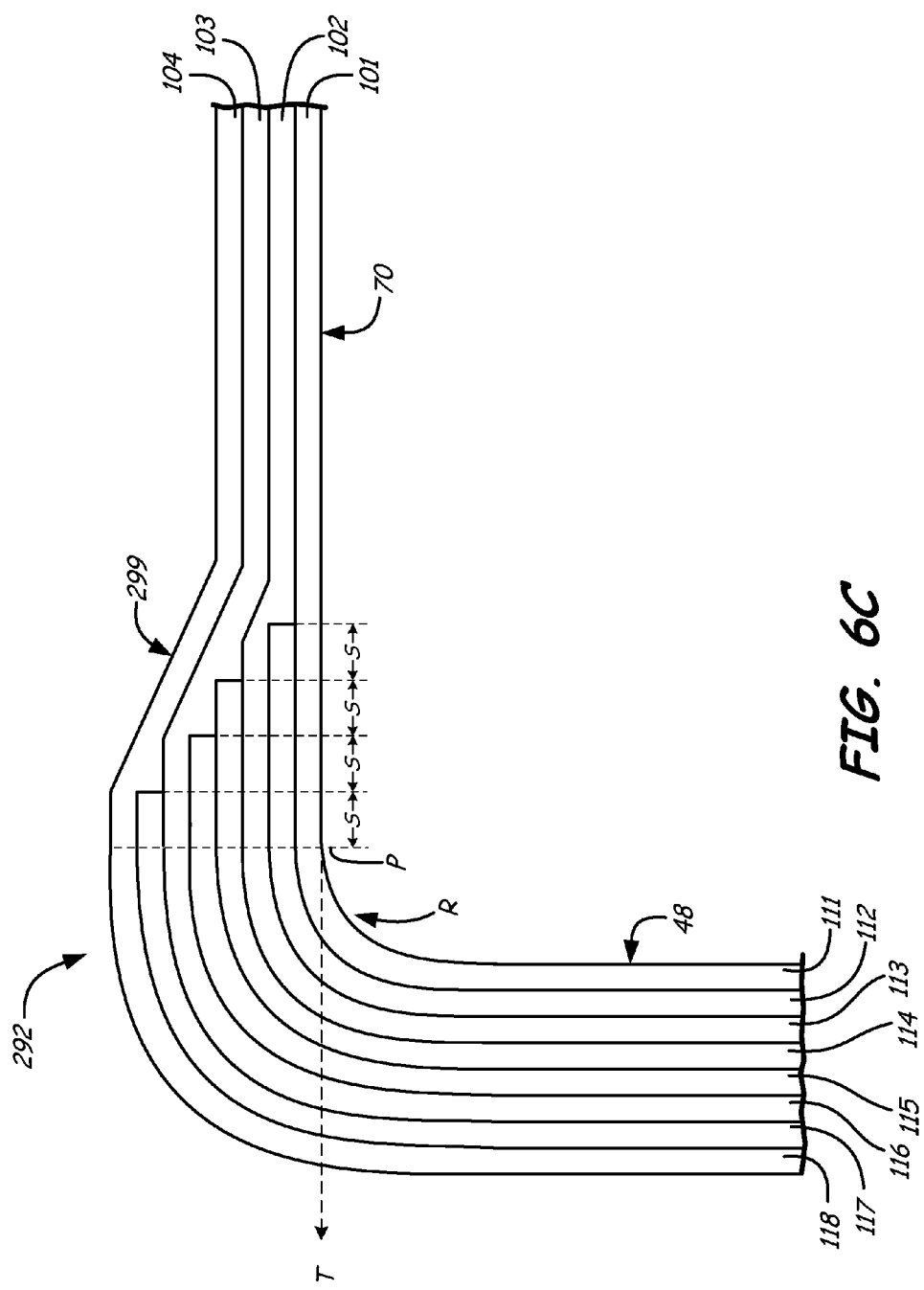

Cylinder-to-plenum joint 92 includes transition section 99 in plain-weave carbon-fiber fabric plies from the eight plies of plenum 48 to the four plies of outer cylinder 70. Thus, at cylinder-to-plenum joint 92, the laminate stacking sequence transitions from A-B-B-A-A-B-B-A to A-B-B-A over transition section 99. This transition is accomplished by dropping off plies from the eight layer sequence beyond point P where outer cylinder 70 forms tangent T to radius of curvature R of cylinder-to-plenum joint 92. In some embodiments, single plies are dropped off at minimum spacing S (for example, 0.125 inches (3.18 mm)) from point P, and from each other along outer cylinder 70 in a direction from plenum 48 to outer cylinder 70. FIGS. 6A, 6B, and 6C illustrate three embodiments employing transitions of this type. The embodiment of FIG. 6A shows cylinder-to-plenum joint 92 including transition section 99. Transition section 99 begins at point P and extends away from plenum 48 toward outer cylinder 70. At minimum spacing S past point P, sixth plenum layer 116 drops off, followed by the drop off of fifth plenum layer 115 at minimum spacing S past the drop off of sixth plenum layer 116, followed by the drop off of fourth plenum layer 114 at minimum spacing S past the drop off of fifth plenum layer 115, and finally the drop off of third plenum layer 113 at minimum spacing S past the drop off of fourth later 114. First plenum layer 111 continues on to join first cylinder layer 101, second plenum layer 112 continues on to join second cylinder layer 102, seventh plenum layer 117 continues on to join third cylinder layer 103, and eighth plenum layer 118 continues on to join fourth cylinder layer 104. Dropped plies include two A oriented layers and two B oriented layers such that at cylinder-to-plenum joint 92, the laminate stacking sequence transitions from the A-B-B-A-A-B-B-A laminate stacking sequence of plenum 48 to the A-B-B-A laminate stacking sequence of outer cylinder 70. This transition of plies provides the mechanical strength necessary to support the level of mechanical stress experienced by cylinder-to-plenum joint 92.

The embodiment of FIG. 6B shows cylinder-to-plenum joint 192 including transition section 199. Transition section 199 begins at point P and extends away from plenum 48 toward outer cylinder 70. At minimum spacing S past point P, eighth plenum layer 118 drops off, followed by the drop off of seventh plenum layer 117 at minimum spacing S past the drop off of eighth plenum layer 118, followed by the drop off of sixth plenum layer 116 at minimum spacing S past the drop off of seventh plenum layer 117, and finally the drop off of fifth plenum layer 115 at minimum spacing S past the drop off of sixth later 116. First plenum layer 111 continues on to join first cylinder layer 101, second plenum layer 112 continues on to join second cylinder layer 102, third plenum layer 113 continues on to join third cylinder layer 103, and fourth plenum layer 114 continues on to join fourth cylinder layer 104. As with the previous embodiment, dropped plies include two A oriented layers and two B oriented layers such that at cylinder-to-plenum joint 192, the laminate stacking sequence transitions from the A-B-B-A-A-B-B-A laminate stacking sequence of plenum 48 to the A-B-B-A laminate stacking sequence of outer cylinder 70.

The embodiment of FIG. 6C shows cylinder-to-plenum joint 292 including transition section 299. Transition section 299 begins at point P and extends away from plenum 48 toward outer cylinder 70. At minimum spacing S past point P, seventh plenum layer 117 drops off, followed by the drop off of fifth plenum layer 115 at minimum spacing S past the drop off of seventh plenum layer 117, followed by the drop off of fourth plenum layer 114 at minimum spacing S past the drop off of fifth plenum layer 115, and finally the drop off of second plenum layer 112 at minimum spacing S past the drop off of fourth layer 114. First plenum layer 111 continues on to join first cylinder layer 101, third plenum layer 113 continues on to join second cylinder layer 102, sixth plenum layer 116 continues on to join third cylinder layer 103, and eighth plenum layer 118 continues on to join fourth cylinder layer 104. As with the previous embodiment, dropped plies include two A oriented layers and two B oriented layers such that at cylinder-to-plenum joint 292, the laminate stacking sequence transitions from the A-B-B-A-A-B-B-A laminate stacking sequence of plenum 48 to the A-B-B-A laminate stacking sequence of outer cylinder 70.

Figure 6D:
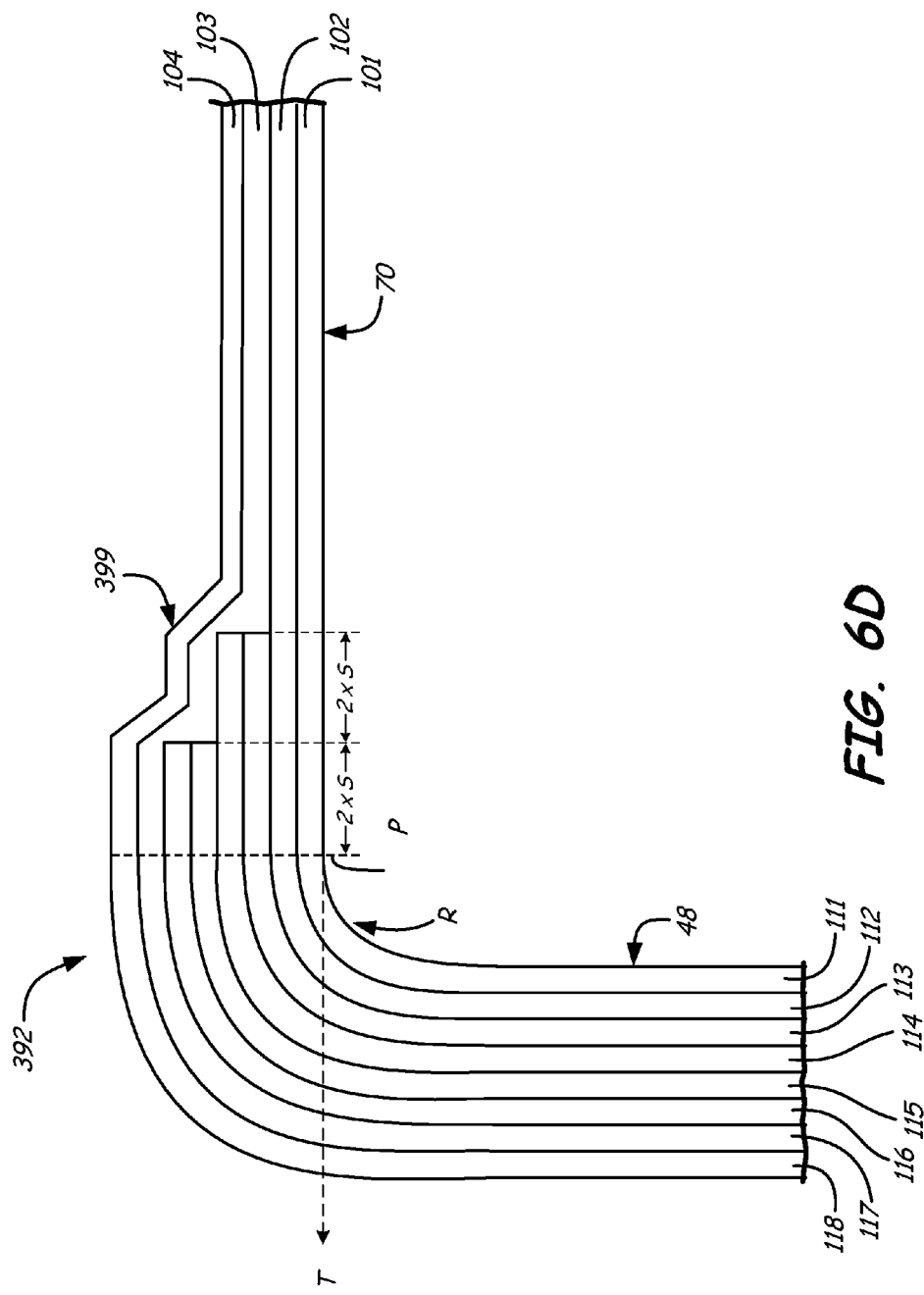

In other embodiments, two plies are dropped at the same location, but no closer than twice the minimum spacing S (for example, 0.250 inches (6.35 mm)) along outer cylinder 70 from point P, and from any other dropped ply. FIG. 6D illustrates one embodiment employing a transition of this type. The embodiment of FIG. 6D shows cylinder-to-plenum joint 392 including transition section 399. Transition section 399 begins at point P and extends away from plenum 48 toward outer cylinder 70. At twice minimum spacing S past point P, fifth plenum layer 115 and sixth plenum layer 116 both drop off, followed by the drop off of third plenum layer 113 and fourth plenum layer 114 at minimum spacing S past the drop off of fifth plenum layer 115 and sixth plenum layer 116. First plenum layer 111 continues on to join first cylinder layer 101, second plenum layer 112 continues on to join second cylinder layer 102, seventh plenum layer 117 continues on to join third cylinder layer 103, and eighth plenum layer 118 continues on to join fourth cylinder layer 104. As with the previous embodiment, dropped plies include two A oriented layers and two B oriented layers such that at cylinder-to-plenum joint 392, the laminate stacking sequence transitions from the A-B-B-A-A-B-B-A laminate stacking sequence of plenum 48 to the A-B-B-A laminate stacking sequence of outer cylinder 70.

In still other embodiments, the drop off of plies extends to at least 0.500 inches (12.70 mm) from point P, and along outer cylinder 70 in a direction from plenum 48 to outer cylinder 70. In all embodiments illustrated, dropped plies include two A oriented layers and two B oriented layers such that at cylinder-to-plenum joint 92, the laminate stacking sequence transitions from the A-B-B-A-A-B-B-A laminate stacking sequence of plenum 48 to the A-B-B-A laminate stacking sequence of outer cylinder 70. This transition of plies provides the mechanical strength necessary to support the level of mechanical stress experienced by cylinder-to-plenum joint 92.

Figure 7:
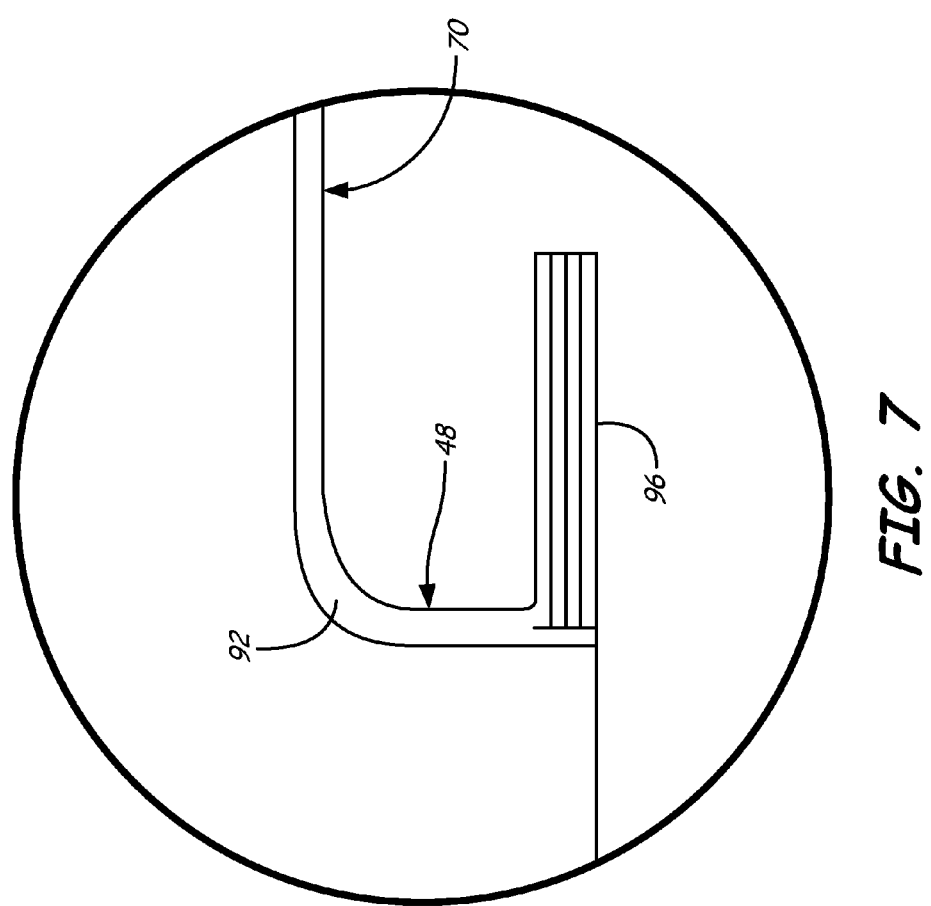
FIG. 7 is a cross-sectional view of another portion of the outer housing of FIG. 4.

In contrast to walls and joints, flanges of outer housing 18 must be much thicker to withstand mechanical stresses associated with the flange connections. As shown in FIG. 7, plenum flange 96 is much thicker than the rest of plenum 48. This is achieved by building up plies of plain-weave carbon-fiber fabric until reaching a final target thickness of plenum flange 96. In some embodiments, plenum flange 96 is built up to a thickness of between 0.100 inches and 0.140 inches (or between 2.5 mm and 3.6 mm) by adding two or three A-B-B-A stacking sequences each having a nominal thickness of 0.026 inches (or of 0.66 mm) to the A-B-B-A-A-B-B-A stacking sequence of plenum 48 which extends into plenum flange 96. In other embodiments, the A-B-B-A-A-B-B-A stacking sequence of plenum 48 is separated in plenum flange 96 and additional plies are sandwiched between the separated portions to create a thickness of between 0.100 inches and 0.140 inches (or between 2.5 mm and 3.6 mm).

Figure 8:
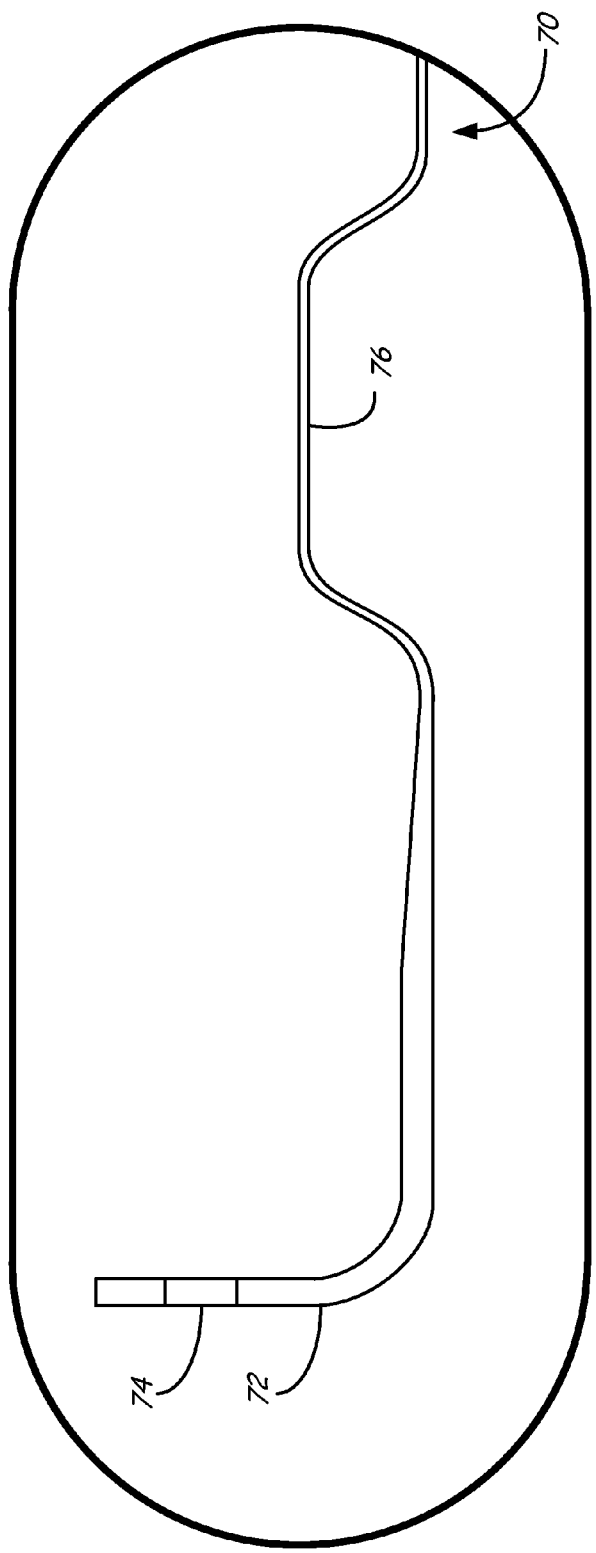
FIG. 8 is a cross-sectional view of another portion of the outer housing of FIG. 4.

FIG. 8 is a cross-sectional view of another portion of the outer housing of FIG. 4. FIG. 8 shows inlet flange 72 and one of the inlet flange bolt holes 74. Inlet flange 72 must be much thicker than the wall of outer cylinder 70 to withstand mechanical stresses associated with a flange connection. Inlet flange 72 is created by building up plies of plain-weave carbon-fiber fabric in the laminate stacking sequence A-B-B-A, and repeating this stacking sequence until reaching a final target thickness. As shown in FIG. 8, for inlet flange 72, this thickness extends from inlet flange 72 into a wall section of outer cylinder 70, where the extra plies drop off until the single A-B-B-A wall thickness of outer cylinder 70 is reached.

The present invention is a ram air fan outer housing that is durable, while also being lightweight. An outer housing embodying the present invention is made out of fiber-reinforced polymer composite plies, such as carbon-fiber plies, oriented in a laminate stacking sequence of A-B-B-A and A-B-B-A-A-B-B-A, creating very strong and lightweight walls. By transitioning laminate stacking sequences from the thicker A-B-B-A-A-B-B-A plenum sequence to the thinner A-B-B-A outer cylinder sequence, the joint between the two includes the strong eight ply laminate stacking sequence of the plenum to handle the mechanical stresses of the joint. Finally, the outer housing is designed with an exceptionally small ratio of the external length of the outer cylinder to the external diameter of the outer cylinder at the ram air fan outlet. The relatively large outer cylinder diameter at the ram air fan outlet enables efficient fan flow. Keeping the length of the outer cylinder relatively short reduces stresses on the outer housing, particularly the joint between the outer cylinder and the plenum. By reducing stresses, less material is required to reinforce these joints, contributing to a relatively lightweight outer housing.

Novel aspects of outer housing 18, including outer cylinder 70 and plenum 48 of the present invention described herein are achieved by substantial conformance to specified geometries. It is understood that edge breaks and curved radii not specifically described herein, but normally employed in the art, may be added to outer housing 18 to enhance manufacturability, ease assembly, or improve durability while retaining substantial conformance to specified geometries.

Alternatively, substantial conformance is based on a determination by a national or international regulatory body, for example in a part certification or parts manufacture approval (PMA) process for the Federal Aviation Administration, the European Aviation Safety Agency, the Civil Aviation Administration of China, the Japan Civil Aviation Bureau, or the Russian Federal Agency for Air Transport. In these embodiments, substantial conformance encompasses a determination that a particular ram air fan outer housing is identical to, or sufficiently similar to, the specified outer housing 18 comprising outer cylinder 70 and plenum 48, or that the ram air fan outer housing is sufficiently the same with respect to a part design in a type-certified ram air fan outer housing, such that the ram air fan outer housing complies with airworthiness standards applicable to the specified ram air fan outer housing. In particular, substantial conformance encompasses any regulatory determination that a particular part or structure is sufficiently similar to, identical to, or the same as a specified outer housing 18 of the present invention, such that certification or authorization for use is based at least in part on the determination of similarity.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

DISCUSSION OF POSSIBLE EMBODIMENTS

The following are non-exclusive descriptions of possible embodiments of the present invention.

A ram air fan outer housing for directing air from a ram air fan rotor and air from a ram air bypass into a ram air fan outlet, the outer housing including an outer cylinder and a plenum. The outer cylinder has a ram air fan rotor end and a ram air fan outlet end. The ram air fan rotor end and the ram air fan outlet end are at opposite ends of an axis of the outer cylinder. The outer cylinder includes walls having a laminate stacking sequence of at least four adjacent layers of plain-weave carbon-fiber fabric, each layer of the four adjacent outer cylinder layers having a weave orientation such that a first outer cylinder layer and a fourth outer cylinder layer are oriented forty-five degrees from each of a second outer cylinder layer and a third outer cylinder layer, the second outer cylinder layer and the third outer cylinder layer sandwiched between the first outer cylinder layer and the fourth outer cylinder layer. The plenum directs air from the ram air bypass into the outer cylinder. The plenum includes walls having a laminate stacking sequence of at least eight adjacent plenum layers of plain-weave carbon-fiber fabric, each layer of the eight adjacent layers having a weave orientation such that a first plenum layer, a fourth plenum layer, a fifth plenum layer, and an eighth plenum layer are oriented forty-five degrees from each of a second plenum layer, a third plenum layer, a sixth plenum layer, and a seventh plenum layer; the second plenum layer and the third plenum layer are sandwiched between the first plenum layer and the fourth plenum layer; the sixth plenum layer and the seventh plenum layer are sandwiched between the fifth plenum layer and the eighth plenum layer; and the fourth plenum layer and the fifth plenum layer are sandwiched between the third plenum layer and the sixth plenum layer. The plenum is joined to the outer cylinder at a joint region. The joint region includes a transition section transitioning the laminate stacking sequence from the eight adjacent layers of the plenum walls to the four adjacent layers of the outer cylinder walls.

The ram air fan outer housing of the preceding paragraph can optionally include, additionally and/or alternatively, any one or more of the following features, configurations and/or additional components:

a plenum flange including eight adjacent plenum layers of plain-weave carbon-fiber fabric extending from the plenum walls into the plenum flange; and additional plies of plain-weave carbon-fiber fabric attached to the eight adjacent plenum layers to produce a desired plenum flange thickness;

wherein the desired plenum flange thickness is between 0.100 inches and 0.140 inches (or between 2.5 mm and 3.6 mm);

wherein a ratio of an external length of the outer cylinder to an external diameter of the outer cylinder at the ram air fan outlet end is no greater than 1.5827, wherein the external length of the outer cylinder is a distance from the ram air fan rotor end to the ram air fan outlet end in a direction parallel to the axis of the outer cylinder;

wherein a ratio of an external length of the outer cylinder to an external diameter of the outer cylinder at the ram air fan outlet end is no greater than 1.5827 and no less than 1.5720, wherein the external length of the outer cylinder is a distance from the ram air fan rotor end to the ram air fan outlet end in a direction parallel to the axis of the outer cylinder;

wherein an external length of the outer cylinder is between 26.755 inches and 26.875 inches (or between 679.58 mm and 682.63 mm) and an external diameter of the outer cylinder at the ram air fan outlet is between 16.980 inches and 17.020 inches (or between 431.29 mm and 432.31 mm);

wherein the joint region extends into each of the outer cylinder and the plenum to at least 0.500 inches (or at least 12.7 mm) beyond any point where the outer cylinder or the plenum forms a tangent to a radius of curvature of the joint region;

wherein the outer cylinder further includes an outer cylinder support ridge extending along at least a portion of the outer cylinder in a plane perpendicular to the axis of the cylinder, and comprising a protruding section of the outer cylinder wall; and wherein the outer cylinder support ridge protrudes between 0.290 inches and 0.310 inches (or between 7.37 mm and 7.87 mm) radially outward from the outer cylinder wall.

A ram air fan assembly for directing air from fan rotor and air from a ram air bypass into a ram air fan outlet includes a fan housing; a fan motor attached to the fan housing; a fan rotor; a thrust shaft connecting the fan motor to the fan rotor; an inlet housing connected to the fan housing; a bearing housing attached to the fan housing; an inner housing attached to the bearing housing; and an outer housing connected to the fan housing and containing the bearing housing, the inner housing, and a portion of the fan housing. The outer housing includes an outer cylinder and a plenum. The outer cylinder has a ram air fan rotor end and a ram air fan outlet end. The ram air fan rotor end and the ram air fan outlet end are at opposite ends of an axis of the outer cylinder. The outer cylinder includes walls having a laminate stacking sequence of at least four adjacent layers of plain-weave carbon-fiber fabric, each layer of the four adjacent outer cylinder layers having a weave orientation such that a first outer cylinder layer and a fourth outer cylinder layer are oriented forty-five degrees from each of a second outer cylinder layer and a third outer cylinder layer, the second outer cylinder layer and the third outer cylinder layer sandwiched between the first outer cylinder layer and the fourth outer cylinder layer. The plenum directs air from the ram air bypass into the outer cylinder. The plenum includes walls having a laminate stacking sequence of at least eight adjacent plenum layers of plain-weave carbon-fiber fabric, each layer of the eight adjacent layers having a weave orientation such that a first plenum layer, a fourth plenum layer, a fifth plenum layer, and an eighth plenum layer are oriented forty-five degrees from each of a second plenum layer, a third plenum layer, a sixth plenum layer, and a seventh plenum layer; the second plenum layer and the third plenum layer are sandwiched between the first plenum layer and the fourth plenum layer; the sixth plenum layer and the seventh plenum layer are sandwiched between the fifth plenum layer and the eighth plenum layer; and the fourth plenum layer and the fifth plenum layer are sandwiched between the third plenum layer and the sixth plenum layer. The plenum is joined to the outer cylinder at a joint region. The joint region includes a transition section transitioning the laminate stacking sequence from the eight adjacent layers of the plenum walls to the four adjacent layers of the outer cylinder walls.

The ram air fan assembly of the preceding paragraph can optionally include, additionally and/or alternatively, any one or more of the following features, configurations and/or additional components:

a plenum flange including eight adjacent plenum layers of plain-weave carbon-fiber fabric extending from the plenum walls into the plenum flange; and additional plies of plain-weave carbon-fiber fabric attached to the eight adjacent plenum layers to produce a desired plenum flange thickness;

wherein the desired plenum flange thickness is between 0.100 inches and 0.140 inches (or between 2.5 mm and 3.6 mm);

wherein a ratio of an external length of the outer cylinder to an external diameter of the outer cylinder at the ram air fan outlet end is no greater than 1.5827, wherein the external length of the outer cylinder is a distance from the ram air fan rotor end to the ram air fan outlet end in a direction parallel to the axis of the outer cylinder;

wherein a ratio of an external length of the outer cylinder to an external diameter of the outer cylinder at the ram air fan outlet end is no greater than 1.5827 and no less than 1.5720, wherein the external length of the outer cylinder is a distance from the ram air fan rotor end to the ram air fan outlet end in a direction parallel to the axis of the outer cylinder;

wherein an external length of the outer cylinder is between 26.755 inches and 26.875 inches (or between 679.58 mm and 682.63 mm) and an external diameter of the outer cylinder at the ram air fan outlet is between 16.980 inches and 17.020 inches (or between 431.29 mm and 432.31 mm);

wherein the joint region extends into each of the outer cylinder and the plenum to at least 0.500 inches (or at least 12.7 mm) beyond any point where the outer cylinder or the plenum forms a tangent to a radius of curvature of the joint region;

wherein the outer cylinder further includes an outer cylinder support ridge extending along at least a portion of the outer cylinder in a plane perpendicular to the axis of the cylinder, and comprising a protruding section of the outer cylinder wall; and wherein the outer cylinder support ridge protrudes between 0.290 inches and 0.310 inches (or between 7.37 mm and 7.87 mm) radially outward from the outer cylinder wall.

wherein the plenum further includes a plenum flange, the plenum flange including eight adjacent plenum layers of plain-weave carbon-fiber fabric extending from the plenum walls into the plenum flange; and additional plies of plain-weave carbon-fiber fabric attached to the eight adjacent plenum layers to produce a desired plenum flange thickness.

The invention claimed is:

1. A ram air fan outer housing for directing air from a ram air fan rotor and air from a ram air bypass into a ram air fan outlet, the outer housing comprising:

an outer cylinder having a ram air fan rotor end and a ram air fan outlet end, the ram air fan rotor end and the ram air fan outlet end at opposite ends of an axis of the outer cylinder; the outer cylinder including walls having a laminate stacking sequence of at least four adjacent layers of plain-weave carbon-fiber fabric, each layer of the four adjacent outer cylinder layers having a weave orientation such that a first outer cylinder layer and a fourth outer cylinder layer are oriented forty-five degrees from each of a second outer cylinder layer and a third outer cylinder layer, the second outer cylinder layer and the third outer cylinder layer sandwiched between the first outer cylinder layer and the fourth outer cylinder layer; and a plenum for directing air from the ram air bypass into the outer cylinder, the plenum including walls having a laminate stacking sequence of at least eight adjacent plenum layers of plain-weave carbon-fiber fabric, each layer of the eight adjacent layers having a weave orientation such that a first plenum layer, a fourth plenum layer, a fifth plenum layer, and an eighth plenum layer are oriented forty-five degrees from each of a second plenum layer, a third plenum layer, a sixth plenum layer, and a seventh plenum layer; the second plenum layer and the third plenum layer are sandwiched between the first plenum layer and the fourth plenum layer; the sixth plenum layer and the seventh plenum layer are sandwiched between the fifth plenum layer and the eighth plenum layer; and the fourth plenum layer and the fifth plenum layer are sandwiched between the third plenum layer and the sixth plenum layer;

wherein the plenum is joined to the outer cylinder at a joint region, the joint region including a transition section transitioning the laminate stacking sequence from the eight adjacent layers of the plenum walls to the four adjacent layers of the outer cylinder walls.

2. The outer housing of claim 1, wherein the plenum further includes:
a plenum flange including:
eight adjacent plenum layers of plain-weave carbon-fiber fabric extending from the plenum walls into the plenum flange; and
additional plies of plain-weave carbon-fiber fabric attached to the eight adjacent plenum layers to produce a desired plenum flange thickness.

3. The outer housing of claim 2, wherein the desired plenum flange thickness is between 0.100 inches and 0.140 inches (or between 2.5 mm and 3.6 mm).

4. The outer housing of claim 1, wherein a ratio of an external length of the outer cylinder to an external diameter of the outer cylinder at the ram air fan outlet end is no greater than 1.5827, wherein the external length of the outer cylinder is a distance from the ram air fan rotor end to the ram air fan outlet end in a direction parallel to the axis of the outer cylinder.

5. The outer housing of claim 1, wherein a ratio of an external length of the outer cylinder to an external diameter of the outer cylinder at the ram air fan outlet end is no greater than 1.5827 and no less than 1.5720, wherein the external length of the outer cylinder is a distance from the ram air fan rotor end to the ram air fan outlet end in a direction parallel to the axis of the outer cylinder.

6. The outer housing of claim 1, wherein an external length of the outer cylinder is between 26.755 inches and 26.875 inches (or between 679.58 mm and 682.63 mm) and an external diameter of the outer cylinder at the ram air fan outlet is between 16.980 inches and 17.020 inches (or between 431.29 mm and 432.31 mm).

7. The outer housing of claim 1, wherein the joint region extends into each of the outer cylinder and the plenum to at least 0.500 inches (or at least 12.7 mm) beyond any point where the outer cylinder or the plenum forms a tangent to a radius of curvature of the joint region.

8. The outer housing of claim 1, wherein the outer cylinder further comprises:
an outer cylinder support ridge extending along at least a portion of the outer cylinder in a plane perpendicular to the axis of the cylinder, and comprising a protruding section of the outer cylinder wall.

9. The outer housing of claim 8, wherein the outer cylinder support ridge protrudes between 0.290 inches and 0.310 inches (or between 7.37 mm and 7.87 mm) radially outward from the outer cylinder wall.

10. A ram air fan assembly comprising:
a fan housing;
a fan motor attached to the fan housing;
a fan rotor;
a thrust shaft connecting the fan motor to the fan rotor;
an inlet housing connected to the fan housing;
a bearing housing attached to the fan housing;
an inner housing attached to the bearing housing; and
an outer housing connected to the fan housing and containing the bearing housing, the inner housing, and a portion of the fan housing; for directing air from fan rotor and air from a ram air bypass into a ram air fan outlet; the outer housing comprising:
an outer cylinder having a ram air fan rotor end and a ram air fan outlet end, the ram air fan rotor end and the ram air fan outlet end at opposite ends of an axis of the outer cylinder; the outer cylinder including walls having a laminate stacking sequence of at least four adjacent layers of plain-weave carbon-fiber fabric, each layer of the four adjacent outer cylinder layers having a weave orientation such that a first outer cylinder layer and a fourth outer cylinder layer are oriented forty-five degrees from each of a second outer cylinder layer and a third outer cylinder layer, the second outer cylinder layer and the third outer cylinder layer sandwiched between the first outer cylinder layer and the fourth outer cylinder layer; and
a plenum for directing air from the ram air bypass into the outer cylinder, the plenum including walls having a laminate stacking sequence of at least eight adjacent plenum layers of plain-weave carbon-fiber fabric, each layer of the eight adjacent layers having a weave orientation such that a first plenum layer, a fourth plenum layer, a fifth plenum layer, and an eighth plenum layer are oriented forty-five degrees from each of a second plenum layer, a third plenum layer, a sixth plenum layer, and a seventh plenum layer; the second plenum layer and the third plenum layer are sandwiched between the first plenum layer and the fourth plenum layer; the sixth plenum layer and the seventh plenum layer are sandwiched between the fifth plenum layer and the eighth plenum layer; and the fourth plenum layer and the fifth plenum layer are sandwiched between the third plenum layer and the sixth plenum layer;
wherein the plenum is joined to the outer cylinder at a joint region, the joint region including a transition section transitioning the laminate stacking sequence from the eight adjacent layers of the plenum walls to the four adjacent layers of the outer cylinder walls.

11. The ram air fan assembly of claim 10, wherein the plenum further includes:
a plenum flange including:

eight adjacent plenum layers of plain-weave carbon-fiber fabric extending from the plenum walls into the plenum flange; and additional plies of plain-weave carbon-fiber fabric attached to the eight adjacent plenum layers to produce a desired plenum flange thickness.

12. The ram air fan assembly of claim 11, wherein the desired plenum flange thickness is between 0.100 inches and 0.140 inches (or between 2.5 mm and 3.6 mm).

13. The ram air fan assembly of claim 10, wherein a ratio of an external length of the outer cylinder to an external diameter of the outer cylinder at the ram air fan outlet end is no greater than 1.5827, wherein the external length of the outer cylinder is a distance from the ram air fan rotor end to the ram air fan outlet end in a direction parallel to the axis of the outer cylinder.

14. The ram air fan assembly of claim 10, wherein a ratio of an external length of the outer cylinder to an external diameter of the outer cylinder at the ram air fan outlet end is no greater than 1.5827 and no less than 1.5720, wherein the external length of the outer cylinder is a distance from the ram air fan rotor end to the ram air fan outlet end in a direction parallel to the axis of the outer cylinder.

15. The ram air fan assembly of claim 10, wherein an external length of the outer cylinder is between 26.755 inches and 26.875 inches (or between 679.58 mm and 682.63 mm) and an external diameter of the outer cylinder at the ram air fan outlet is between 16.980 inches and 17.020 inches (or between 431.29 mm and 432.31 mm).

16. The ram air fan assembly of claim 10, wherein the joint region extends into each of the outer cylinder and the plenum to at least 0.500 inches (or at least 12.7 mm) beyond any point where the outer cylinder or the plenum forms a tangent to a radius of curvature of the joint region.

17. The ram air fan assembly of claim 10, wherein the outer cylinder further comprises:

an outer cylinder support ridge extending along at least a portion of the outer cylinder in a plane perpendicular to the axis of the cylinder, and comprising a protruding section of the outer cylinder wall.

18. The ram air fan assembly of claim 17, wherein the first outer cylinder support ridge protrudes between 0.290 inches and 0.310 inches (or between 7.37 mm and 7.87 mm) radially outward from the outer cylinder wall.

\* \* \* \* \*